United States Patent [19]

Backofen et al.

[11] 3,853,615
[45] Dec. 10, 1974

[54] DEVICE FOR EXTRACTION OF PLANTS CONTAINING SUGAR

[75] Inventors: Hans-Dieter Backofen, Braunschweig; Dietrich Dittmann, Salzgitter-Lebenstedt, both of Germany

[73] Assignee: Braunschweigische Maschinenbauanstalt, Braunschweig, Germany

[22] Filed: Dec. 21, 1972

[21] Appl. No.: 317,169

[30] Foreign Application Priority Data
Jan. 8, 1972   Germany............................ 2200795

[52] U.S. Cl......................... 127/5, 23/270 R, 127/7
[51] Int. Cl............................................... C13d 1/12
[58] Field of Search.................................... 127/2–8; 23/269, 270 R

[56] References Cited
UNITED STATES PATENTS

| | | | |
|---|---|---|---|
| 2,569,199 | 9/1951 | Smet...................................... | 127/5 |
| 2,996,413 | 8/1961 | Delacroix............................ | 127/7 X |
| 3,660,042 | 5/1972 | Duchateau............................. | 127/6 |
| 3,666,556 | 5/1972 | Steele..................................... | 127/7 |

*Primary Examiner*—Morris O. Wolk
*Assistant Examiner*—Sidney Marantz
*Attorney, Agent, or Firm*—Wolfgang G. Fasse; Willard W. Roberts

[57] ABSTRACT

A device for extracting sugar from sugar plants has a horizontal container internally divided into chambers by vertical partitions. A rotatable shaft extending through the container rotates lifting wheels in each chamber to effect transfer of the plants successively from chamber to chamber, and thence out of the container. Water is introduced into the last chamber and by means of external ducts flows successively toward the end of the chamber at which the plants are loaded. The level of fluid in the chambers decreases successively toward the exit.

11 Claims, 4 Drawing Figures

DEVICE FOR EXTRACTION OF PLANTS CONTAINING SUGAR

BACKGROUND OF THE INVENTION

The invention relates to a device for extraction of plant products containing sugar such as sugar cane, in which a horizontal container is provided at one end with an intake opening for the plant products and an outlet opening for the extraction liquid, and is provided at the other end with an intake opening for receiving the extraction liquid as well as with an outlet opening for the extracted plant product. Rotating conveying devices are provided inside of the container in order to direct the plants and the extraction liquid in a counterflow relation.

Extraction devices are known in which the container rotates with the conveying device. Such conveying devices are constructed so that they are rigidly connected to the container wall. German Pat. Nos. 332,708, 727,091, 1,050,311 and German published applications (DT-OS) 1,908,148 and 2,040,984 show devices of this type. Some of these known devices are provided for extraction of salt or similar matter. Due to the special reaction of plant cells, working conditions arise which vary considerably from those required for washing of salts.

The control of the flow of liquids is difficult in all known equipment of the type employing a cylindrical rotating container. Accurate control of the flow of liquids is important in particular, however, for sugar extraction from appropriate plant products, in order to extract the sugar as completely and as effectively as possible. In rotating drums liquids of different concentrations are liable to amalgamate. Either the yield or the efficiency of the extraction process deteriorates due to this comingling. In addition, in this type of drum parts of the extraction liquid may circulate repeatedly through the drum-type container and thus remain for an extended period in the extracting device. Sugar juices suffer losses in quality, however, if they remain in the extracting device for too long a period.

These disadvantages also occur in extracting devices having a fixed container and which have two combined internal screw conveyors for the transport of plants. Such devices are described in the German accepted application (DT-AS) No. 1,124,920 and in the German Pat. No. 1,519,754.

Another extracting construction is shown in German Pat. No. 817,445. The special characteristic of this device, which is suited for the extraction of oleiferous plants, is a circular extraction chamber in a container, the ring axis of which extends horizontally. A driving mechanism moves screen-type separating walls which are assembled radially around the ring axis. Cells are thus formed, which rotate around the ring axis and are filled with matter to be extracted. The matter to be extracted is fed at the vertex of the ring, then goes down and then goes upwards again until the outlet point at the peak is reached. The extraction liquid is fed near the outlet point of the extracted matter and is discharged via screens into a bottom part. A counterflow between the oleiferous plants and the extraction liquid is only possible between the outlet point of the material and the bottom part by discharging the extraction liquid through a relevant opening. Almost the total area, between that point at which the cells move downwards from the feeding point of the matter to the area of the discharge opening for the extraction liquid cannot be used for the formation of a counter flow.

In German published application (DT-OS) No. 1,912,277 an extracting equipment having a ring of moving cells is described. This construction differs from those extracting devices already mentioned, but it operates in the same way as the equipment already discussed. This device is intended for extraction of plants containing sugar. Only half of the annular arc of this device can be used for the counterflow formation, since the juice discharge opening is located at the central height of the ring. A juice discharge opening above that level would not provide substantial advantages, since juice of a high sugar concentration has an accordingly high specific weight, and thus gathers preferably in the bottom section of a tank, if this container also contains juice of lower concentration. In the present case, the juice with the highest concentration gathers in the bottom part and not in the top section where the juice is discharged.

Percolation bed diffusers have also been used successfully for extraction of sugar cane. In such diffusers the plants are agitated as a layer on the liquid permeable bottom in these devices, and while agitated, they are irrigated from the top with extraction liquid. A drip pan, which is located under the liquid permeable bottom, is allocated to each irrigation location. The liquid received from each drip pan is conveyed with the help of pumps to the closest irrigation place towards the feeding point of the plant product. Thus a relative motion results, which is similar to the counterflow, between the plants and the liquid, though the liquid always percolates through the plant layer in horizontal direction. In doing so, the liquid can be directed rather accurately, and the total length of the device is available for the counterflow. Therefore good extraction results are achieved with this type of extracting device. However, the fact that these devices consume a lot of space constitutes a disadvantage. Another disadvantage of this arrangement is the fact that a relatively large number of pumps and other accessories are required for treating the liquids.

OBJECTS OF THE INVENTION

In view of the foregoing, it is the aim of this invention to achieve the following objects singly or in combination:

to provide a device for the extraction of plants containing sugar in which the commingling of liquids of different concentrations in different chambers is eliminated;

to provide a device for the extraction of plants containing sugar in which circulating means are provided for assuring that the sugar juices do not remain in the device for too long a period;

to provide a device for the extraction of plants containing sugar in which effective counterflow is provided between the plants products moving in one direction and the fluid moving in the other direction;

to provide a device for the extraction of plants containing sugar in which the fluid having the highest concentration of sugar is readily discharged; and to provide a device for the extraction of plants containing sugar which has small dimensions, which has the advantage that it reliably processes the ex-

SUMMARY OF THE INVENTION

In accordance with the invention, in order to achieve the above objects a cylindrical container is divided into a number of chambers by means of vertical partitions which are assembled perpendicularly with respect to the cylinder axis, the chambers succeeding the direction of the axis. A driven shaft runs concentrically to the cylinder axis through all of the chambers. A lifting wheel is mounted on the shaft in each chamber. The upper section of each partition contains a delivery chute which runs from the respective chamber to the neighboring chamber towards the outlet opening for the extracted solid matter. Adjacent chambers are interconnected by tubes running outside the container. Each tube runs from a liquid outlet opening in the bottom part of a chamber to a liquid intake opening located at the desired liquid level of the neighboring chamber in the direction towards the outlet opening for the extracted liquid.

The extraction liquid in the device according to the invention is discharged by a discharge opening in the bottom part from the individual chambers and is directed to the subsequent chamber in the upper section, at about the height of the envisaged liquid level. This construction permits a reliable control of the liquid flow and at the same time avoids any pumps, valves and fittings. As long as the extraction liquid is fed in continuous relation to the quantity of the discharged extraction liquid, it is guaranteed that the extraction liquid in one chamber does not exceed the height of the liquid intake opening of this chamber, thus dangerous mixtures are avoided as well as uncontrolled circulation of the extraction liquid.

In an advantageous further developement of a new device, each lifting wheel is equipped with screen-type carriers forming cells which externally are limited by the container wall and internally by an arched wall, which extend at that side, where the carriers ascend when the shaft rotates, from the delivery chute to the area of the envisaged liquid level.

Rollers or wedges may be arranged at the container wall or at the partition, the rollers or wedges extending between the grate bars of the passing carriers for exerting pressure on the transporting plants. The rollers or wedges may be positioned in the area of the delivery chute. In this case they press extraction liquid from the plant product before delivery to the following chamber.

Rollers or wedges may also be provided in the bottom part of the chambers in order to temporarily press the immersed plants in order to favorably influence the extraction process.

It is particularly simple to equip the new device with a heating coil in the bottom part in order to keep the matter to be extracted and the extraction liquid at the required operating temperature. This entails the advantage of another considerable simplification, since in prior devices special heat exchangers had to be used in order to maintain the extraction liquid at the operating temperature.

A particularly good safeguard against mixing of liquids of different concentrations is obtained by assembling the liquid intake openings at various heights, and by decreasing the height of the juice intake openings from one chamber to another towards the plant feeding opening.

BRIEF FIGURE DESCRIPTION

In order that the invention will be more clearly understood, it will now be described in greater detail with reference to the accompanying drawings, in which FIG. 1 is a partial side view of the device according to the invention;

DETAILED DESCRIPTION OF EXAMPLE EMBODIMENTS

Figure 1:
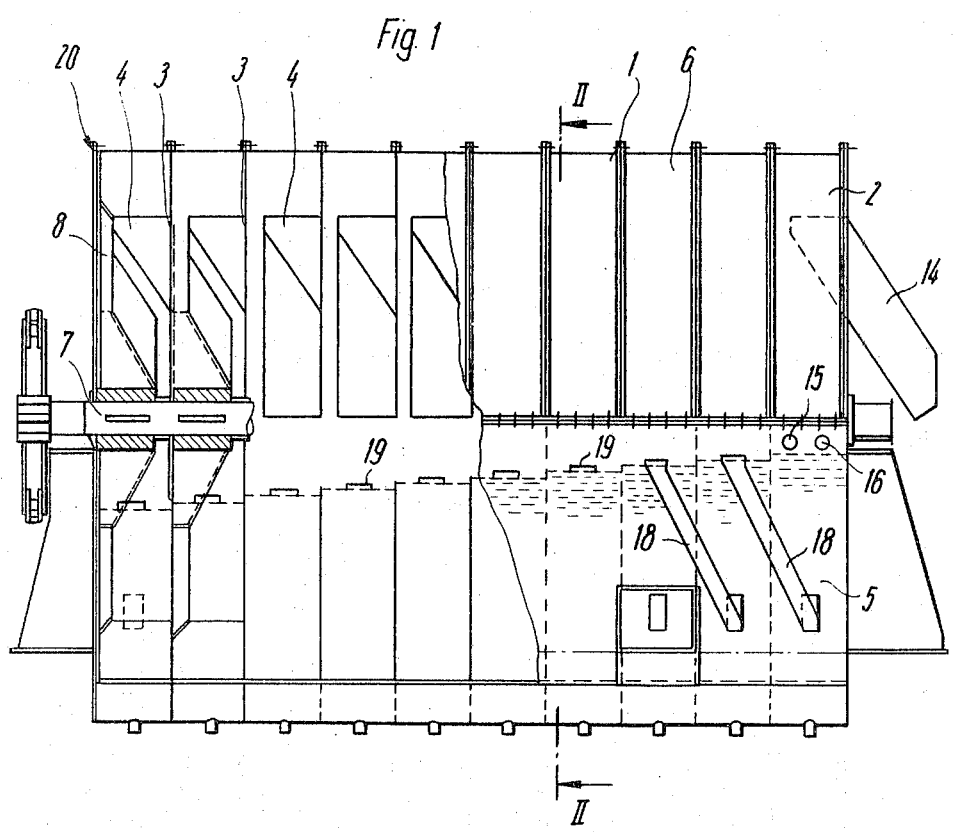

The figures show a construction of an extraction device 1 according to the invention. The device 1 has a horizontal cylindrical container 2. The container is divided by partitions 3, which extend vertically and perpendicularly to the container axis and the cylinder axis. The partitions 3 divide the container into a number of successive chambers 4 in the axial direction of the container.

In the illustrated example of the device, the container is made of several parts and consists of a lower horizontal tub 5 and several arched upper covers 6. Each chamber is provided with a separate arched cover 6.

Figure 2:
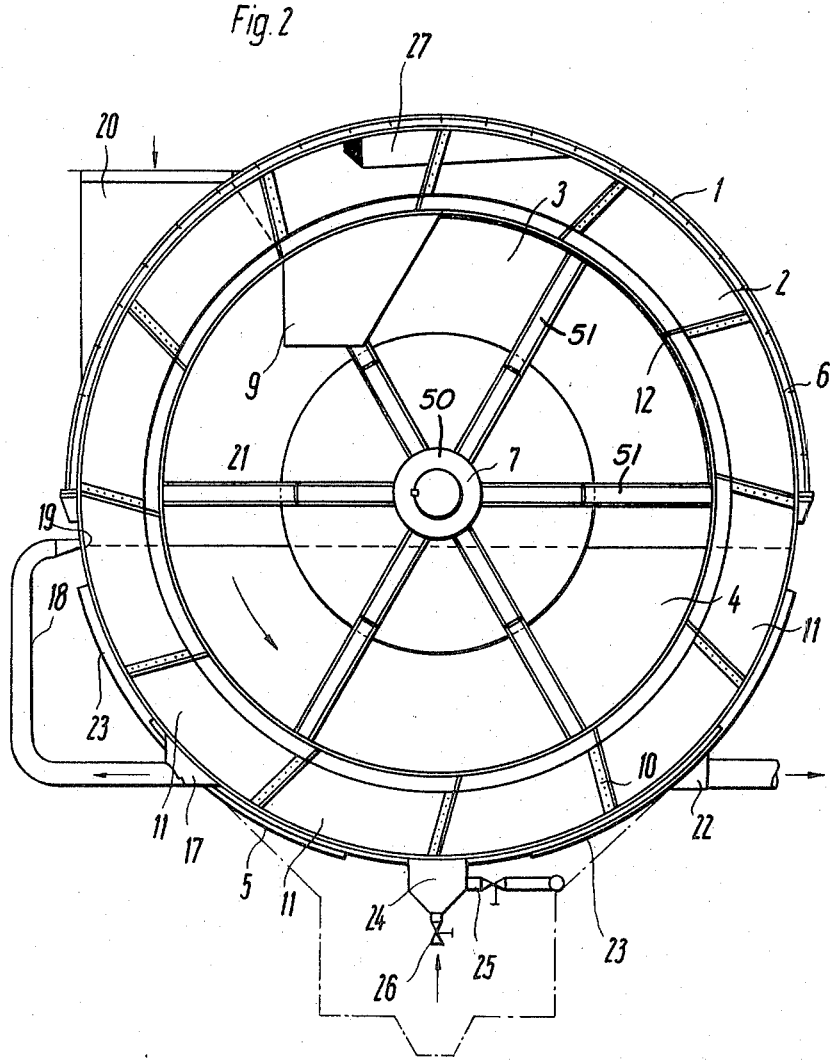
FIG. 2 is a sectional view of the device according to FIG. 1, the sectional plane being taken along line II—II of FIG. 1.
Figure 3:
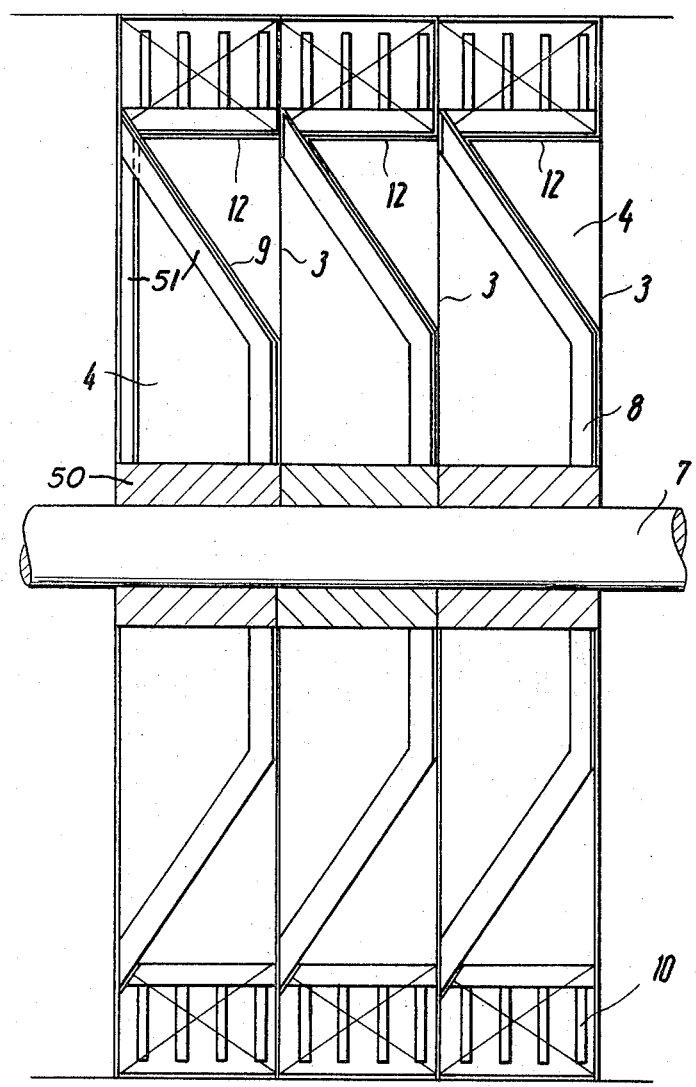
FIG. 3 is an enlarged view of three neighboring chambers of the device of FIG. 1 taken along an axially extending sectional plane.

A shaft extends along the container axis. The shaft is adapted to be rotated by an appropriate driving mechanism, which is not shown. A separate lifting wheel 8 is mounted on the shaft 7 in each chamber 4, the wheels 8 being mounted for rotation by the shaft. Each partititon 3 has a delivery chute 9. The delivery chutes 9, as shown in FIGS. 2 and 3, extend upwardly at an angle from each partition 3 into the adjacent left hand chamber (FIG. 3), and in the upper part of the respective chamber, so that plants may be dropped into the top of the delivery chute and be delivered to the adjacent chamber to the right through an opening in the wall of the partition. The lifting wheels 8 are provided with carriers 10 at their outer peripheries. These carriers are made of grate-like bars or grates. The wheels as illustrated have hubs 50 and suitably dimensioned spokes 51 mounted on the hubs to provide adequate support for the bars 10 while avoiding interference with the chute 9. The carriers 10 form cells 11 (FIG. 2), which point radially outwardly of the chutes 9 and are limited externally by the walls of the container 2. The cells are substantially open toward the axis of the container. In the area in which the cells 11 move in ascending direction upon rotation of the shaft 7 in the direction shown by the arrow, however, an arched wall 12 encloses the radially inward side of the cell to prevent the plants from falling out of the cells in this area. The arched wall, as shown in FIG. 2, thus extends from the level of liquid in the chamber to the chute 9.

The plants, which are fed through the feeding opening 13, in the first chamber contact the extraction liquid in each chamber due to the rotation of the shaft 7. The lifting wheels 8 remove the plants from each individual chamber and throw it into the succeeding chamber 3 via the respective delivery chute 9. Thus the plant product is moved from one chamber to another, transfering its sugar content to the extraction liquid in each chamber, and finally is conveyed to an outlet chute 14 by way of a discharge opening in the last chamber, and is removed from the device 1. Appropriate dehydration equipment (not shown) may be provided following the discharge chute 14 in order to dehydrate the extracted plants to the extent necessary for the subsequent purposes.

The lifting wheels in the individual chambers provide a reliable and even delivery of the plants from one chamber to another through the total container of the device. By means of an appropriate control of the quantity of the plants supplied to the chambers as a function of the height of the level of the extraction liquid in the individual chambers, it is possible to achieve an intense contact of the extraction liquid and the plants in a small space. A specific sugar content of the extraction liquid is obtained in each chamber during operation of the device. When a great number of chambers is used, there are very slight concentration differences from one chamber to another. The slighter this difference in concentration is from one chamber to another, the more the extraction process resembles a continuous counterflow extraction process.

A feed opening 15 is provided at the end of the container 2 in which the discharge chute 14 is installed, in order to feed extraction liquid thereto, which may be fresh water. Additionally another liquid intake opening 16 is provided in the end container. This opening may be employed to feed the press water into the container 2 obtained from subsequent dehydration of the extracted plants. The press water contains a certain amount of sugar.

Figure 4:
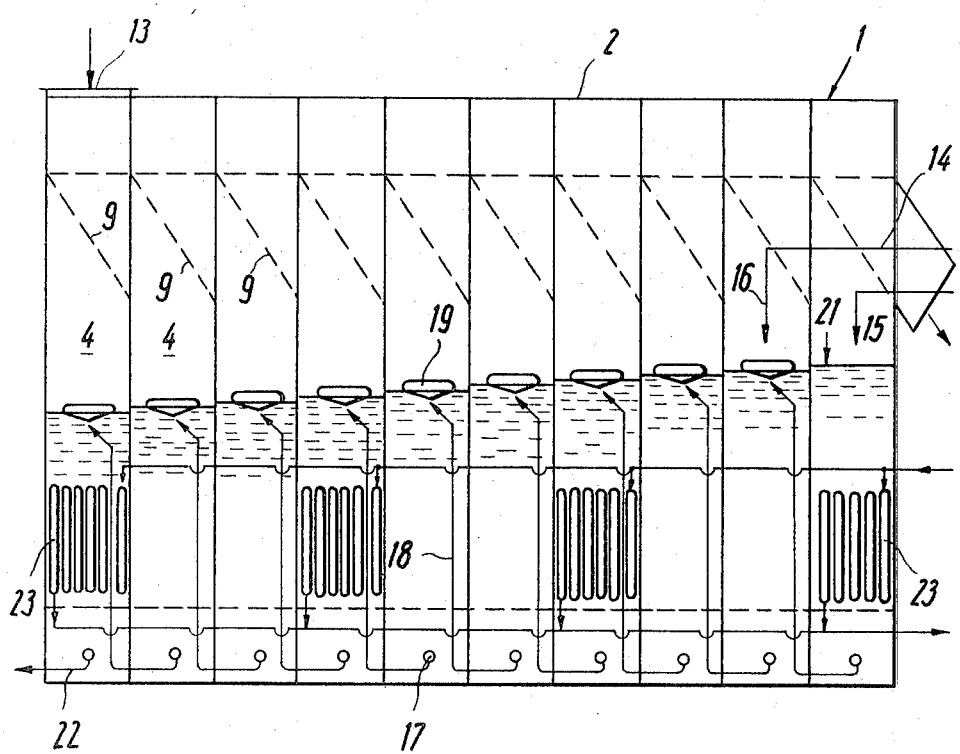
FIG. 4 is a schematic drawing of the device according to the invention.

A liquid discharge opening 17 is provided in the bottom part of each chamber 4 (cf. FIG. 2), the opening being covered by a suitable screen (not shown) on the inside of the chamber to block the flow of solids. A tube 18 extends from this liquid discharge opening 17 to a liquid intake opening 19 in the neighboring chamber, i.e., in that chamber which is situated in the direction towards a feeding opening 20 through which the plants to be extracted are fed into the container 2. The level of the liquid intake openings 19 in the illustrated structure is chosen so that this level corresponds to the liquid level 21 up to which the chamber is filled with extraction liquid. FIGS. 1 and 4 show that the liquid intake openings 19 towards the feeding opening 20 are successively lower from one chamber to another. Thus a graduated liquid level in the succeeding chambers is achieved, provided that the amount of the liquid which is discharged through the outlet opening 22 (from the container 2 equals the amount of liquid which is fed through the intake opening 15 and the intake opening 16. This graduation of the liquid level 21, prevents the mixing of liquids with different concentrations.

The container 2 is provided with heating coils 23 (FIG. 4) in its lower part. These heating coils 23 can be fed with steam by suitable conventional means in order to maintain the correct operating temperature inside the container 2. Sand collecting chambers 24 and discharge valves 25 (FIG. 2) are assembled adjacent the lowest part of the individual chambers 4. The sand collecting chambers 24 may be provided with automatically operating discharge sluices 26 for periodically removing any collected sand.

A wedge 27 is shown in FIG. 2 in the upper part of chamber 4. This wedge, which either is mounted at the container wall or at the partition, extends only between the grate bars of the carriers 10 as the lifting wheel 8 rotates. The plant product conveyed by the carriers is thus pressed by action of the wedges 27 and is more or less dehydrated, depending upon the amount of pressure employed, before it is transferred into the subsequent chamber by means of the delivery chute 9. Similar wedges or loaded rolls, which also extend between the grates of the carriers 10, may also be provided at other points in the chamber. Such wedges or rolls are particularly desirable in that area of the chamber in which the plants are immersed in the extraction liquid.

A similar effect may be obtained if the carriers 10 are hinged to the lifting wheel and are deflected by non-circular counter-surfaces affixed along the periphery of the container wall.

The above described device is especially suited for extraction of sugar from crushed sugar cane. However, it also is possible to use it for the extraction of other plant products, such as for sugar extraction from sugar beet cossettes.

The device in accordance with the invention has small dimensions, and has the advantage that it handles the extraction liquid reliably, and thus reliably controls the extraction process.

Although the invention has been described with reference to specific example embodiments, it is to be understood that it is intended to cover all modifictions and equivalents within the scope of the appended claims.

What is claimed is:

1. In a device for the extraction of sugar from plant products containing sugar, having a horizontal container, an intake opening for feeding plant products and an outlet for the extraction liquid disposed at one end of the container, an intake opening for receiving extraction liquid and an outlet opening for discharging plant products at the other end of the container, and conveying means in said container for directing the plant products and the extraction liquid in counterflow; the improvement wherein said container is a stationary cylindrical container, comprising a plurality of stationary vertical partitions in said container dividing said container into a plurality of chambers extending along the axis of the container, drive shaft means extending through said chambers substantially concentrically with the axis of the container, a separate lifting wheel mounted on said shaft in each chamber for rotation therewith, stationary delivery chute means in the upper portion of the container between each pair of adjacent partitions for delivering plant products from each chamber to the next adjacent chamber towards the outlet opening for discharging plant products, and tube means interconnecting each chamber with the adjacent chambers outside of said container, each tube extending from a liquid outlet opening in the bottom section of one chamber to a liquid intake opening at a determined level in the adjacent chamber toward the outlet opening for the extraction liquid.

2. The device of claim 1, wherein said lifting wheel comprises grate means.

3. The device of claim 1, wherein each of said lifting wheels comprises on its periphery carrier means defining peripheral cells defined externally by the wall of said container, and arched wall means fixed in the container interiorly of said cells in the region of said chambers where the carrier means ascend upon rotation of the shaft between the liquid level in the respective chamber and delivery chute therein.

4. The device of claim 3, wherein said carrier means comprise grate bars, and further comprising pressing means on the container wall in said chamber, said pressing means comprising means extending between the grate bars of the carrier means for exerting pressure on the plant products in said cells.

5. The device of claim 4, wherein said pressing means is positioned in the section of each chamber adjacent the delivery chute therein.

6. The device of claim 4, wherein said pressing means are positioned in the bottom sections of said chambers.

7. The device of claim 1, further comprising heating means in the bottom section of said container.

8. The device of claim 1, wherein said liquid intake openings are arranged at successively lower levels from one chamber to another toward said intake opening for receiving plant products.

9. The device of claim 4, wherein said pressing means comprise wedges.

10. The device of claim 4, wherein said pressing means comprise rollers.

11. A device for the extraction of sugar from plant products, comprising a horizontal stationary cylindrical container, a plurality of stationary vertical partitions in said container defining chambers along the axis thereof, rotatable shaft means extending through said container substantially along the axis thereof, lifting means affixed to said shaft means in each of said chambers for rotation therewith, said lifting means having peripheral means for moving said plant products, stationary delivery chute means on each said chamber positioned to transport plant products from the peripheral means of each of said lifting means in each chamber to the next adjacent chamber toward one end of said container, tube means interconnecting adjacent chambers for the flow of liquids there between and arranged so that the liquid level in said chambers decreases toward the other end of said container, means for feeding plant products and means for removing extraction liquid from said other end of said container, and means for adding liquid and means for discharging extracted plant products at said one end of said container.

* * * * *